United States Patent
Evans et al.

(10) Patent No.: US 10,954,919 B1
(45) Date of Patent: Mar. 23, 2021

(54) MACHINE-LEARNING MODEL-BASED ANALYTIC FOR MONITORING WIND FARM POWER PERFORMANCE

(71) Applicant: General Electric Company, Schenectady, NY (US)

(72) Inventors: Scott Charles Evans, Burnt Hills, NY (US); Arunvenkataraman Subramanian, Dublin, CA (US); Gerald Bowden Wise, Clifton Park, NY (US); Frank William Ripple, Jr., Broadalbin, NY (US); John Edmund LaFleche, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/590,580

(22) Filed: Oct. 2, 2019

(51) Int. Cl.
*F03D 7/04* (2006.01)
*G06Q 50/06* (2012.01)
(Continued)

(52) U.S. Cl.
CPC ............. *F03D 7/046* (2013.01); *F03D 7/047* (2013.01); *F03D 7/048* (2013.01);
(Continued)

(58) Field of Classification Search
CPC .......... F03D 7/046; F03D 7/048; F03D 7/047; G06F 11/079; G06Q 50/06; G06N 20/10
See application file for complete search history.

(56) References Cited

U.S. PATENT DOCUMENTS 8,587,140 B2    11/2013   Egedal et al.
9,551,322 B2    1/2017    Ambekar et al.
(Continued)

FOREIGN PATENT DOCUMENTS

CN    108448610 A    8/2018
CN    109492777 A    3/2019
(Continued)

OTHER PUBLICATIONS

Evans et al., Towards Wind Farm Performance Optimization Through Empirical Models, 2014 IEEE Aerospace Conference, Big Sky, MT, Mar. 1-8, 2014, pp. 1-12.
(Continued)

*Primary Examiner* — Yuhui R Pan
(74) *Attorney, Agent, or Firm* — Dority & Manning, P.A.

(57) ABSTRACT

A method for controlling a wind turbine includes detecting a plurality of analytic outputs relating to power performance of the wind turbine from a plurality of different analytics. The method also includes analyzing the plurality of analytic outputs relating to power performance of the wind turbine. Further, the method includes generating at least one computer-based model of the power performance of the wind turbine using at least a portion of the analyzed plurality of analytic outputs. Moreover, the method includes training the computer-based model(s) of the power performance of the wind turbine using annotated analytic outputs relating to the power performance of the wind turbine. In addition, the method includes estimating a power magnitude of the wind turbine using the machine-learned computer-based model(s). As such, the method includes implementing a control action when the power magnitude of the wind turbine is outside of a selected range.

20 Claims, 6 Drawing Sheets

(51) Int. Cl.
  *G06N 20/10* (2019.01)
  *G06F 11/07* (2006.01)
  *G05B 23/02* (2006.01)

(52) U.S. Cl.
  CPC ........ *G05B 23/0218* (2013.01); *G06F 11/079* (2013.01); *G06N 20/10* (2019.01); *G06Q 50/06* (2013.01); *G05B 2219/2619* (2013.01)

(56) References Cited

U.S. PATENT DOCUMENTS

| | | | |
|---|---|---|---|
| 9,606,518 B2 | 3/2017 | Evans et al. | |
| 9,644,612 B2 | 5/2017 | Evans et al. | |
| 10,041,475 B1 | 8/2018 | Badrinath et al. | |
| 10,132,295 B2 | 11/2018 | Lund et al. | |
| 2011/0020122 A1 | 1/2011 | Parthasarathy et al. | |
| 2012/0226474 A1* | 9/2012 | Trejo Sanchez ... | G05B 23/0275 702/179 |
| 2013/0073223 A1* | 3/2013 | Lapira ................. | G06F 19/00 702/34 |
| 2016/0084233 A1 | 3/2016 | Evans et al. | |
| 2018/0223807 A1* | 8/2018 | Badrinath Krishna ..................... | F03D 7/046 |
| 2019/0287026 A1* | 9/2019 | Calmon ............... | H04L 9/3239 |
| 2019/0324430 A1* | 10/2019 | Herzog .............. | G05B 23/0254 |

FOREIGN PATENT DOCUMENTS

| | | |
|---|---|---|
| EP | 2 477 086 A1 | 7/2012 |
| EP | 3 249 769 A1 | 11/2017 |
| WO | WO 2017/139046 A1 | 8/2017 |
| WO | WO2018/121668 A1 | 7/2018 |
| WO | WO2018/198225 A1 | 11/2018 |

OTHER PUBLICATIONS

Evans et al., Wind Farm Performance Validation Through Machine Learning: Sector-Wise Honest Brokers, 2015 IEEE Aerospace Conference, Big Sky, MT, Mar. 7-14, 2015, pp. 1-8.
Marvuglia et al., Monitoring of Wind Farms' Power Curves Using Machine Learning Techniques, Applied Energy, vol. 98, Oct. 2012, pp. 574-583. (Abstract Only).
Morshedizadeh et al., Power Production Prediction of Wind Turbines Using a Fusion of MLP and ANFIS Networks, IET Renewable Generation, vol. 12, Issue 9, Jul. 9, 2018, pp. 1025-1033. (Abstract Only).
Ouyang et al., Monitoring Wind Turbines' Unhealthy Status: A Data-Driven Approach, IEEE Transactions on Emerging Topics in Computational Intelligence, Miami, FL, 2018, pp. 1-10.
Rasmussen et al., Gaussian Processes for Machine Learning, Jun. 29, 2010. (Abstract Only) http://www.gaussianprocess.org/gpml/.
Toubakh et al., Advanced Pattern Recognition Approach for Fault Diagnosis of Wind Turbines, 2013 12th International Conference on Machine Learning and Applications, 2013, pp. 368-373.
Vaccaro et al., An Adaptive Framework Based on Multi-Model Data Fusion for One-Day-Ahead Wind Power Forecasting, Electric Power Systems Research, vol. 81, Issue 3, Mar. 2011, pp. 775-782. (Abstract Only).
International Search Report, dated Jun. 4, 2020 for PCT Application No. PCT/US2019/068943.
European Search Report, dated Feb. 12, 2021, for EP Application No. 20199640.2.

* cited by examiner

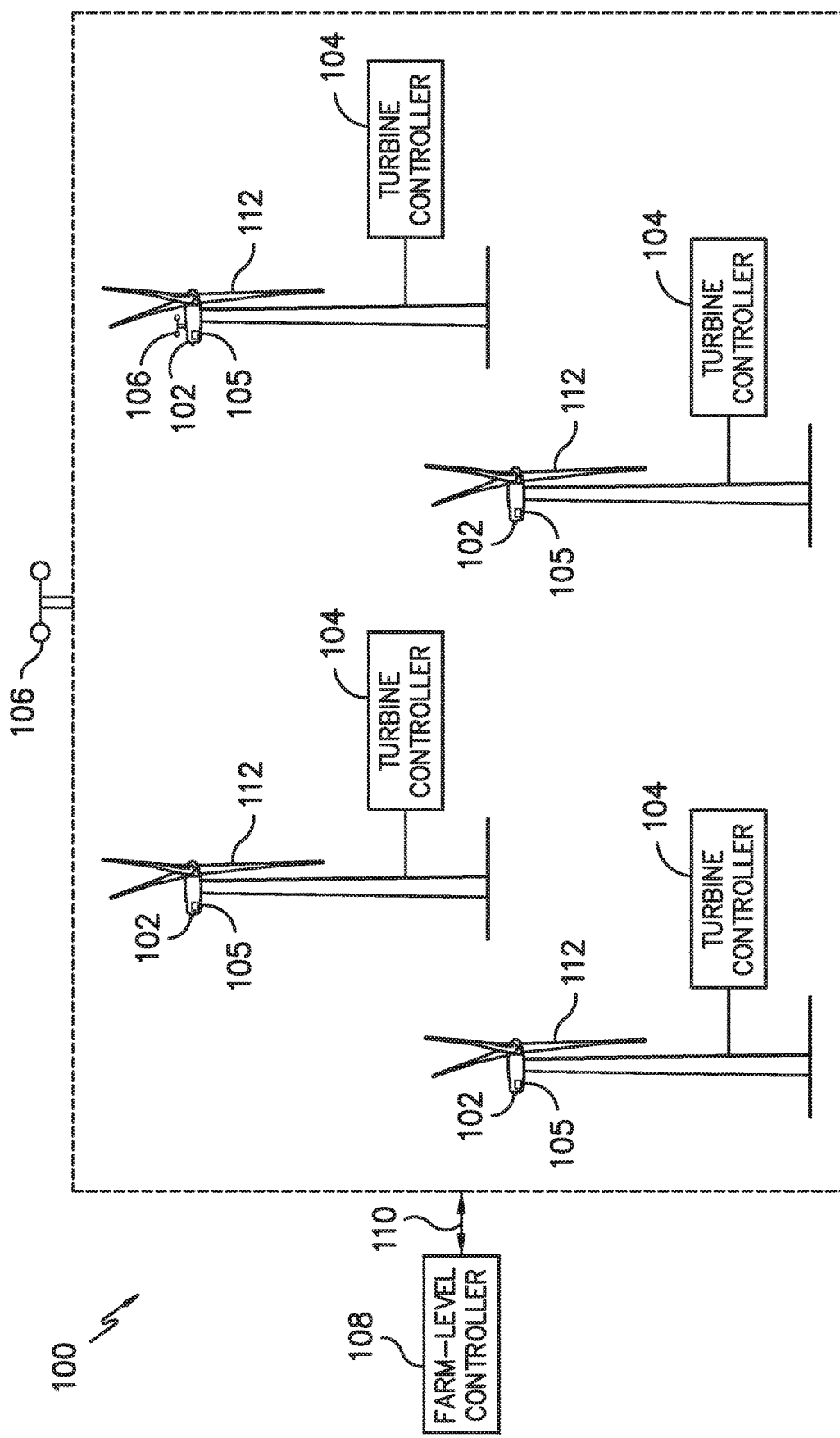
FIG. -1-

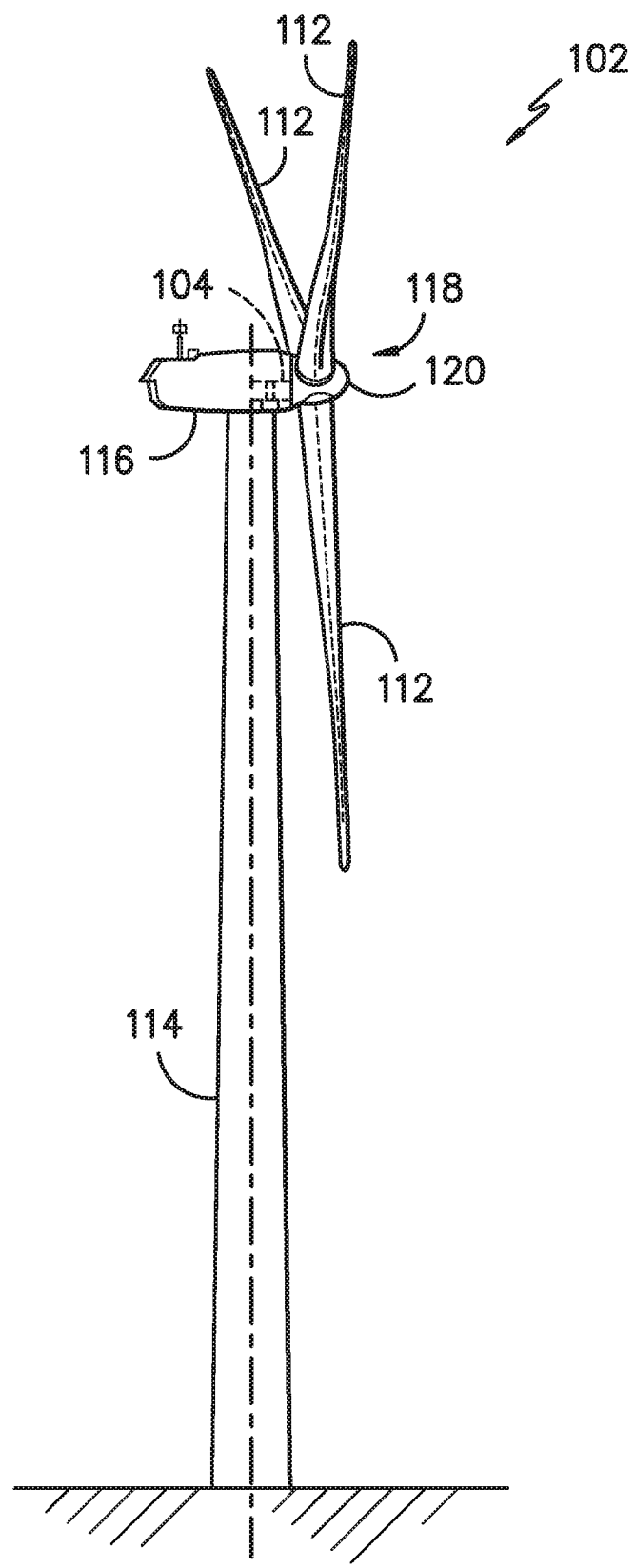
FIG. -2-

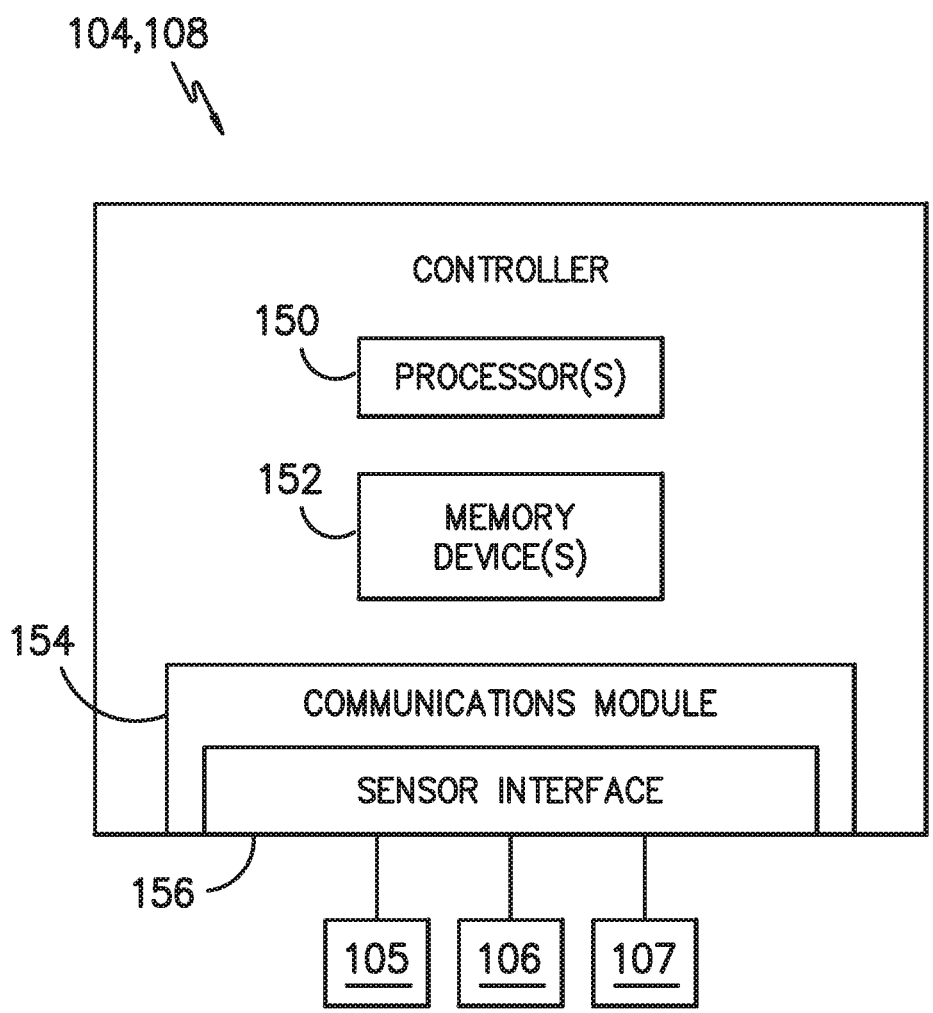
FIG. -3-

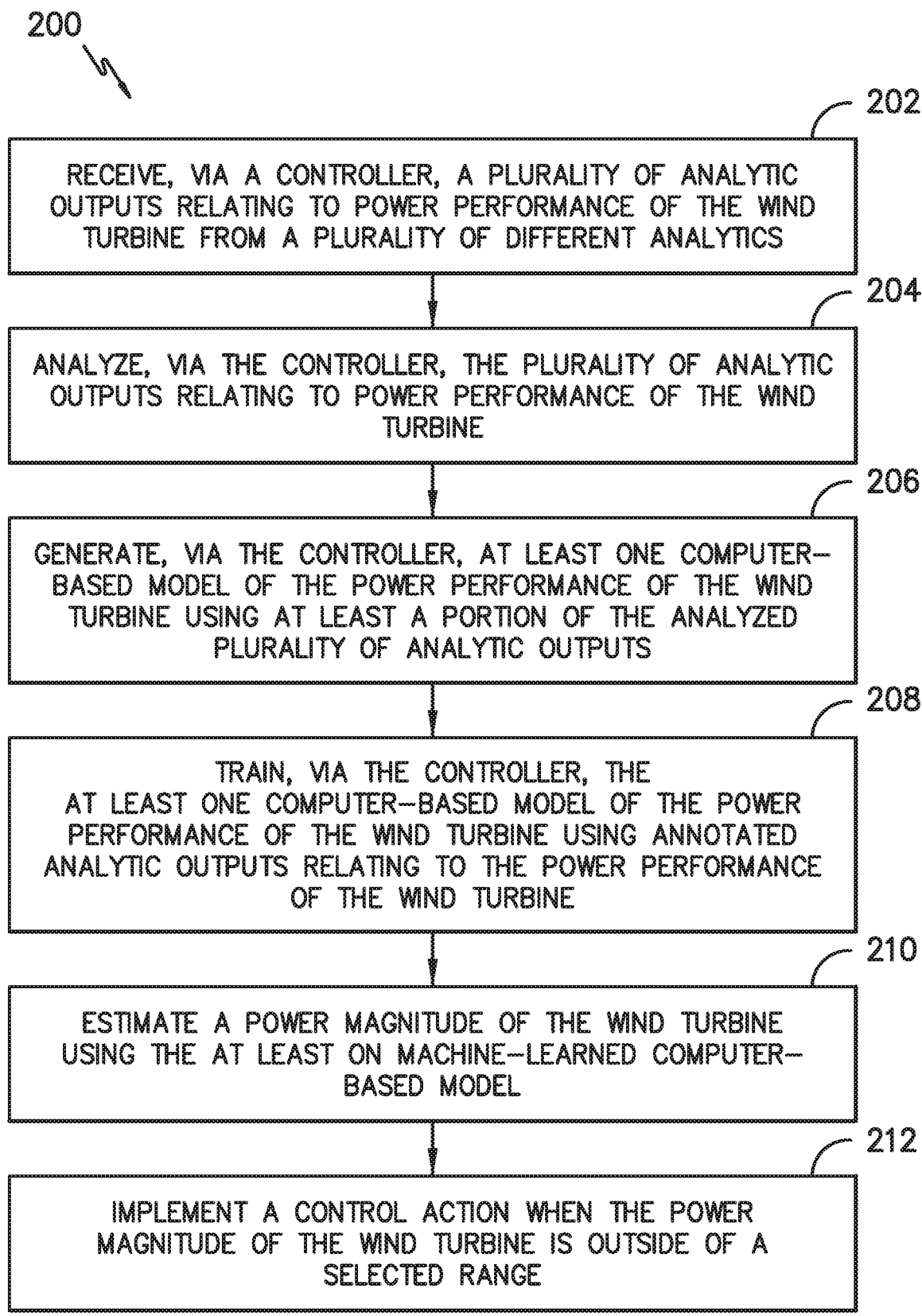
FIG. -4-

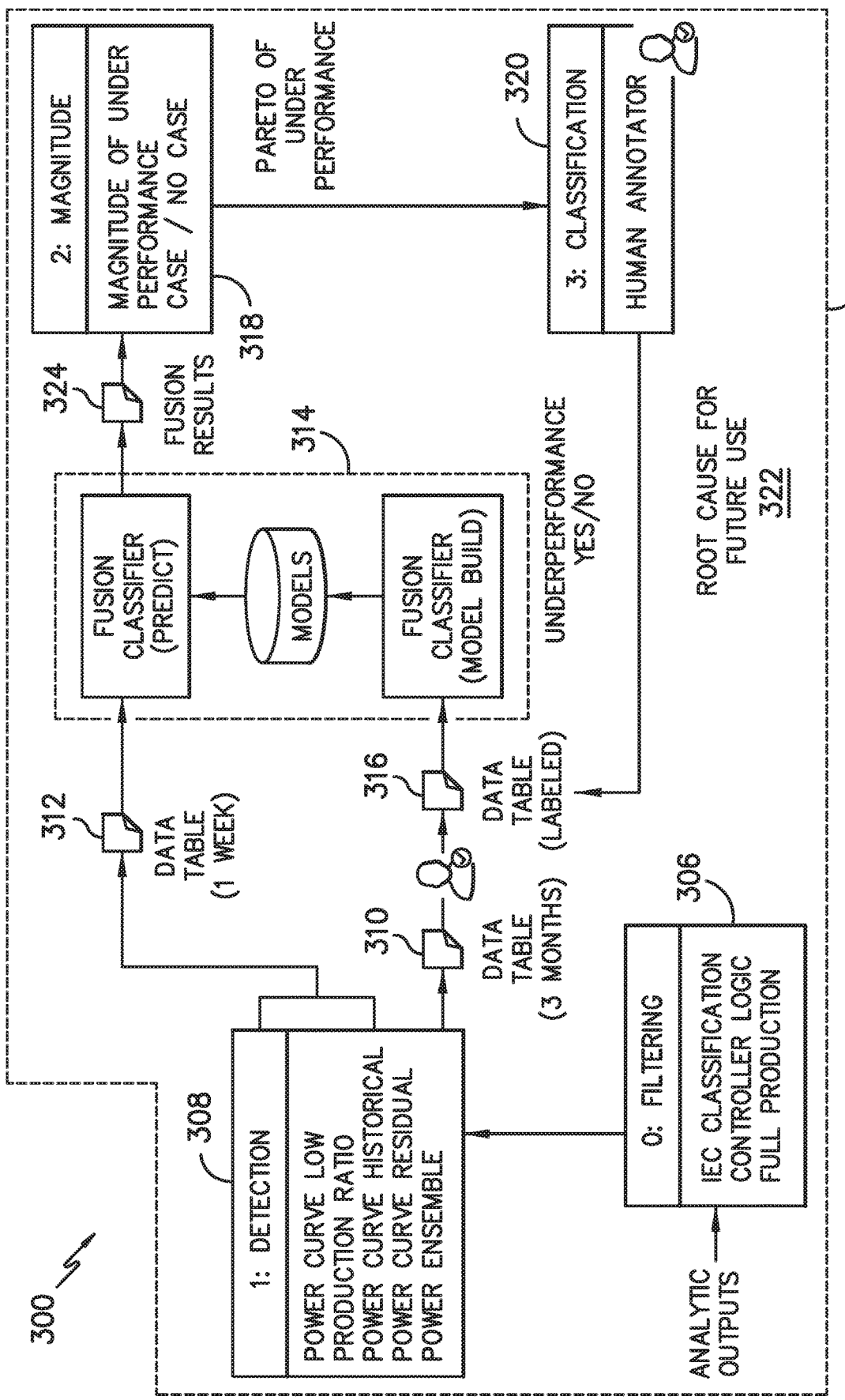
FIG. -5-

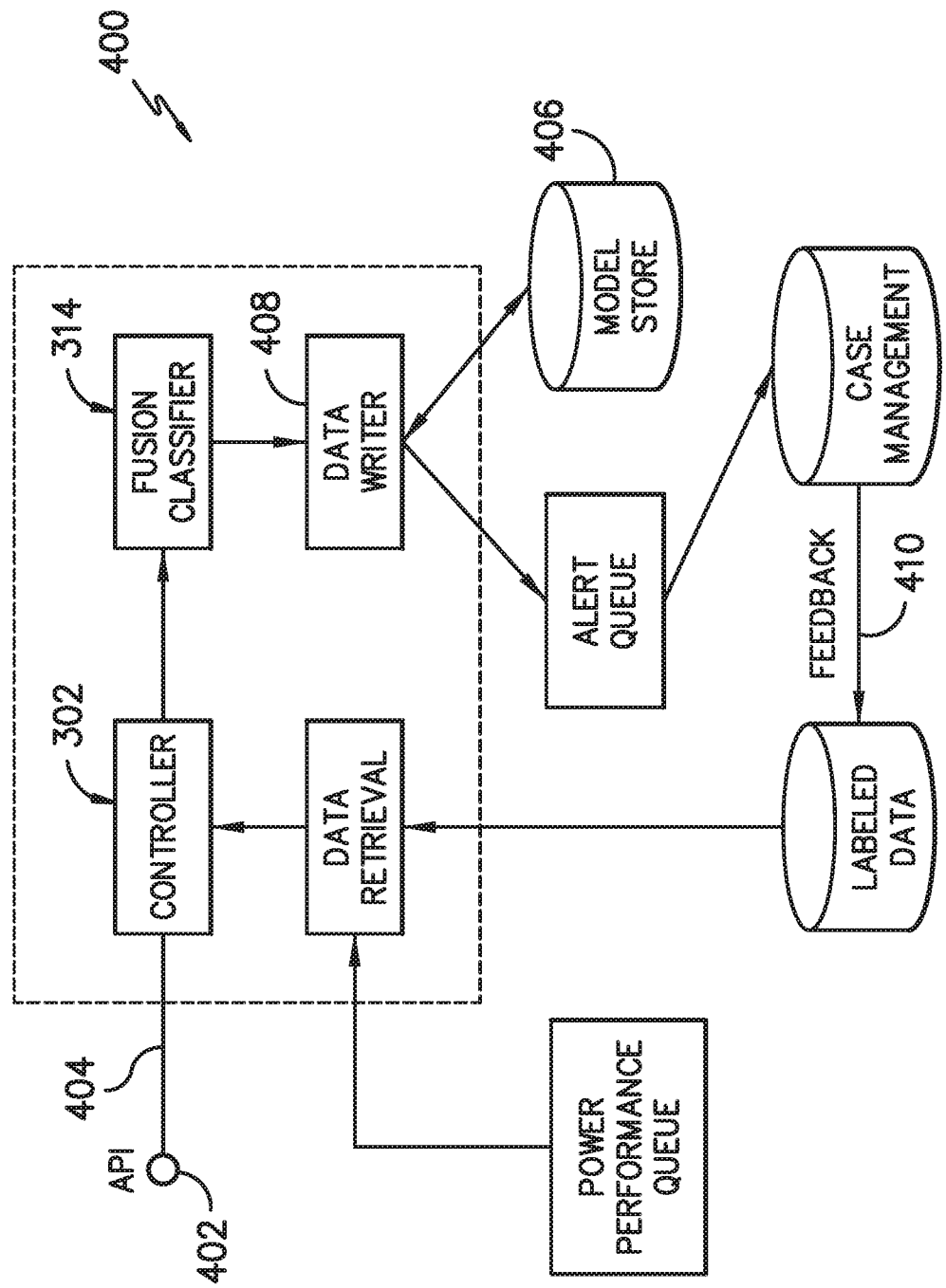

MACHINE-LEARNING MODEL-BASED ANALYTIC FOR MONITORING WIND FARM POWER PERFORMANCE

FIELD

The present disclosure relates generally to wind farms and, more particularly, to a machine-learning model-based analytic for monitoring wind farm performance.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." During operation, it is advantageous to utilize various analytic outputs to evaluate wind turbine and/or wind farm performance to ensure that the wind turbine(s) and/or wind farm are operating properly. However, wind turbine under performance using such individual analytic outputs is a difficult condition to classify. As such, the state of the art provides an overabundance of false alarms, thereby leading operators to ignore analytic outputs that are flagging under performance. Furthermore, all analytic outputs are not computed and made available simultaneously. However, a decision is still desired at the queried instance.

Accordingly, the present disclosure is directed to systems and methods for combining low-performing subsets of available analytic streams to create a machine learning model-based analytic with high precision and accuracy to better estimate wind turbine performance. In addition, systems and methods of the present disclosure also rank the underperforming wind turbines using a power ensemble and/or other analytic that quantifies the extent to which energy has been lost, thereby making it possible for a field engineer to zero in on the key under-performing wind turbines in a wind farm.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The method includes detecting, via a controller, a plurality of analytic outputs relating to power performance of the wind turbine from a plurality of different analytics. The method also includes analyzing, via the controller, the plurality of analytic outputs relating to power performance of the wind turbine. Further, the method includes generating, via the controller, at least one computer-based model of the power performance of the wind turbine using at least a portion of the analyzed plurality of analytic outputs. Moreover, the method includes training, via the controller, the at least one computer-based model of the power performance of the wind turbine using annotated analytic outputs relating to the power performance of the wind turbine. In addition, the method includes estimating a power magnitude of the wind turbine using the at least one machine-learned computer-based model. As such, the method includes implementing a control action when the power magnitude of the wind turbine is outside of a selected range.

In another aspect, the present disclosure is directed to a system for controlling a wind turbine. The system includes a plurality of analytics for generating a plurality of analytic outputs relating to power performance of the wind turbine. Further, the system includes a controller communicatively coupled to the plurality of analytics. The controller is configured to perform a plurality of operations, including but not limited to receiving the plurality of analytic outputs from the plurality of analytics, analyzing the plurality of analytic outputs relating to power performance of the wind turbine, generating at least one computer-based model of the power performance of the wind turbine using at least a portion of the analyzed plurality of analytic outputs, training, via the controller, the computer-based model(s) of the power performance of the wind turbine using annotated analytic outputs relating to the power performance of the wind turbine, estimating a power magnitude of the wind turbine using the machine-learned computer-based model(s), and implementing a control action when the power magnitude of the wind turbine is outside of a selected range. It should be understood that the system may include any one or more of the additional features described herein.

In yet another aspect, the present disclosure is directed to a wind farm. The wind farm includes a plurality of wind turbines each comprising a turbine controller and a farm-level controller communicatively coupled to each of the turbine controllers. The farm-level controller is configured to perform a plurality of operations, including but not limited to receiving a plurality of analytic outputs relating to power performance of each of the wind turbines from a plurality of different analytics, analyzing the plurality of analytic outputs relating to power performance of each of the wind turbines, generating at least one computer-based model of the power performance of each of the wind turbines using at least a portion of the analyzed plurality of analytic outputs, training the at least one computer-based model of the power performance of each of the wind turbines using annotated analytic outputs relating to the power performance of each of the wind turbines, estimating a power magnitude of each of the wind turbines using the at least one machine-learned computer-based model, and implementing a control action when the power magnitude of any one of the wind turbines is outside of a selected range. It should be understood that the wind farm may include any one or more of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind farm according to the present disclosure;

FIG. 2 illustrates a perspective view of one embodiment of a wind turbine according to the present disclosure;

FIG. 3 illustrates a block diagram of one embodiment of a controller of a wind turbine and/or or wind farm according to the present disclosure;

FIG. 4 illustrates a flow diagram of one embodiment of a method for controlling a wind turbine according to the present disclosure;

FIG. 5 illustrates a schematic diagram of a system for controlling a wind turbine according to the present disclosure; and FIG. 6 illustrates a schematic diagram of one embodiment of an analytic micro-service architecture according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a machine-learning model-based analytic for monitoring wind farm performance such that early detection of performance issues can be achieved. More specifically, the machine-learning model-based analytic of the present disclosure combines several wind performance analytics having less precision and accuracy to achieve a single analytic with high precision and accuracy. For example, the model-based analytic uses supervised machine learning on labeled data together with various pre-processing steps and a continuous learning to create an analytic and system capable of detecting under-performance of a wind turbine with minimum missed classifications and minimal false alarms. Accordingly, the present disclosure can also provide a methodology for using factorization and/or principal component analysis to automatically determine the correct number of dimensions to include in the model. In addition, the model may include the power ensemble analytic as one of the feature sets used in the model. Thus, the model of the present disclosure can be continuously improved over time and may continuously add new analytics as they become available.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 1 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm controller 108. Moreover, in one embodiment, the farm controller 108 may be coupled to the turbine controllers 104 through a network 110 to facilitate communication between the various wind farm components. The wind turbines 102 may also include one or more sensors 105, 106, 107 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Referring now to FIG. 3, there is illustrated a block diagram of one embodiment of suitable components that may be included within the farm controller 108, the turbine controller(s) 104, and/or other suitable controller according to the present disclosure. As shown, the controller(s) 104, 108 may include one or more processor(s) 150 and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106, 107 (such as the sensors described herein) to be converted into signals that can be understood and processed by the processors 150. It should be appreciated that the sensors 105, 106, 107 may be communicatively coupled to the communications module 154 using any suitable means. For example, as shown, the sensors 105, 106, 107 are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

Referring now to FIGS. 4 and 5, a method 200 and system 300 for controlling a wind turbine, such as one of the wind turbines 102 in the wind farm 100, are illustrated. More specifically, FIG. 4 illustrates a flow diagram of a method 200 for controlling a wind turbine according to the present disclosure, whereas FIG. 5 illustrates a schematic diagram of a system 300 for controlling a wind turbine according to the present disclosure. In general, as shown in FIG. 4, the method 200 is described herein as implemented for controlling the wind turbine 102 and/or the wind farm 100 described above. However, it should be appreciated that the disclosed method 200 may be used to operate any other wind turbine and/or wind farm having any suitable configuration. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes detecting, via a controller, a plurality of analytic outputs relating to power performance of the wind turbine 102 from a plurality of different analytics. It should be understood that the controller configured to implement the method may be the farm controller 108, one or more of the turbine controllers 104, and/or any other suitable controller located within the wind farm 200 or remote from the wind farm 200. Furthermore, as generally understood, wind turbines generally include a plurality of performance analytics, which generally refer to collected and analyzed data associated with performance of the wind turbine that is or can be categorized, stored, and/or analyzed to study various trends or patterns in the data.

Thus, in an embodiment, as shown in FIG. 5, the system 300 may include a controller 302 (such as one of the turbine controllers 104 or the farm-level controller 108) that receives various analytic outputs relating to power performance of one or more of the wind turbines 102 as shown at 304. Such analytic outputs, for example, may be calculated via a variety of performance analytics. Further, as shown at 308, the controller 302 is configured to detect various performance analytic outputs, which may relate to power curve production ratio (e.g. low or high; contractual power curve), power curve threshold (e.g. farm-level learned curve), power curve historical, power curve residual (e.g. farm average compare), and/or power ensemble (e.g. a turbine-level learned model; anemometer agnostic).

More particularly, as described herein, "power ensemble" wind turbines generally refers to wind turbines that are identified as significant features in determining a turbine of interest's power. Accordingly, power ensemble validation utilizes mean power from key reference wind turbines to determine expectation of power. The power ensemble for a given wind turbine is determined by the wind turbines that are most correlated to a wind turbine of interest that together provide the lowest uncertainty in determining the wind turbine of interest's performance. Advantages of power ensemble are that uncertainty is reduced by using power only from multiple sensors.

Referring back to FIG. 4, as shown at (204), the method 200 includes analyzing, via the controller 302, the plurality of analytic outputs relating to power performance of the wind turbine 102. For example, in an embodiment, the controller 302 may filter the plurality of analytic outputs relating to the power performance, e.g. via a low-pass filter, a high-pass filter, a band pass filter, or combinations thereof. More specifically, as shown in FIG. 5 at 306, the controller 302 may filter the analytic outputs prior to detection of the type of performance analytic. In addition, in further embodiments, the controller 302 may also analyze the analytic outputs, e.g. using principal component analysis or factorization so as to reduce a number of dimensions in the analytic outputs.

Referring still to FIG. 5, the controller 302 may also be configured to analyze the analytic outputs by organizing the analytic outputs into, at least, a first data set 310 and a second data set 312. In such embodiments, the first data set 310 of the plurality of analytic data sets may include data from a first length of time and the second data 312 set may include data from a second length of time. As such, the first length of time may be longer than the second length of time. For example, as shown, the first data set 310 may include long-term data (e.g. a couple of months), whereas the second data set 312 may include short-term data (e.g. a week).

Thus, referring back to FIG. 4, as shown at (206), the method 200 includes generating or building, via the controller 302, at least one computer-based model 314 of the power performance of the wind turbine 102 using at least a portion of the analyzed plurality of analytic outputs. It should be understood that any number of models may be generated, such that a separate model can be created for subsets of feature sets such that the absence of one or more feature analytics will not prevent the algorithm from operating properly.

For example, in a particular embodiment, stepwise linear regression may be utilized to build the model(s) 314. Generally, stepwise linear regression adds or removes features one at a time in an attempt to get the best regression model without over fitting. Further, stepwise regression typically has two variants, including forward and backward regression, both of which are within the scope and spirit of the invention. For example, forward stepwise regression is a step-by-step process of building a model by successive addition of predictor variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling a response variable.

Another statistical method that may be used to generate the model 314 may be an absolute shrinkage and selection operator (LASSO) algorithm. Generally, a LASSO algorithm minimizes the residual sum of squares subject to a constraint that the sum of the absolute value of the coefficients is smaller than a constant. Still another statistical algorithm that may be used to generate the model 314 is a M5 Prime (M5P) algorithm, which is a tree-based regression algorithm that is effective in many domains. For example, whereas stepwise linear regression produces a single global linear model for the data, tree based regression algorithms perform logical tests on features to form a tree structure. Generally, the M5P algorithm utilizes a linear regression model at each node of the tree, providing more specialized models. A machine learning model that necessarily includes direction may also be used along with the mean of the power ensemble group to determine entitlement (i.e., expectation of power). This can be considered an improvement over previous methods that filter data to specific direction sectors (which then form separate models for each sector). Other machine learning methods that may be used to generate the model 314 may also include Gaussian Process Models, Random Forest Models, Support Vector Machines, and/or a micro-service, which is discussed in more detail herein.

Referring back to FIG. 4, as shown at (208), the method 200 also includes training (e.g. via machine learning), via the controller 302, the computer-based model(s) 314 of the power performance of the wind turbine 102 using annotated analytic outputs 316 relating to the power performance of the wind turbine 102. Accordingly, referring back to FIG. 4, as shown at (210), the method 200 includes estimating a power magnitude of the wind turbine 210 using the at least one machine-learned computer-based model 314.

For example, in an embodiment, as shown in FIG. 5 at 318, the controller 302 is configured to continuously train the computer-based model(s) by continuously determining the power magnitude of the wind turbine 102 via the model 314. Thus, as shown at 320, a human annotator can then classify each of the received power magnitudes from the model 314 as an under performance, an over performance, or a standard performance and can also annotate the received power magnitudes of the wind turbine 102, i.e. by correcting the received power magnitudes. As used herein, annotation (e.g. annotated analytics) in machine learning generally refers to a process of labelling data in a manner that can be recognized by machines or computers. Furthermore, such annotation can be completed manually by humans as human annotators generally better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning or clustering, as well as any other suitable accurate labeling process.

The annotated power magnitudes can then be fed into the model(s) 314 for training and/or correcting. In certain instances, as shown at 322, the human annotator may also determine a root cause analysis of the annotated power magnitudes of the wind turbine 102. As shown at 316 and previously mentioned, the annotated power magnitudes (and/or the root cause analysis of the annotated power magnitudes) may also be stored in a data set that can be used to further update the model 314 and/or for future use.

In other words, the controller 302 may include a supervised machine learning algorithm that can apply what has been learned in the past to new data using labeled data to predict future performance (as shown at 324). Starting from the model build, the learning algorithm produces an inferred function to make predictions about the output values. As such, the controller 302 is able to provide targets for any new input after sufficient training. The learning algorithm can also compare its output with the correct, intended output and find errors in order to modify the model accordingly.

In a particular embodiment, as shown in FIG. 6, a schematic diagram of one embodiment of an analytic microservice architecture 400 according to the present disclosure is illustrated. As shown, the analytic application program interface (API) 402 is configured to send power performance model outputs 404 to the controller 302 which provides the performance model outputs to the model 314. The model 314 then trains the data with new labeled data. The model store 406 can be used to store the trained model, whereas the model file 408 can be read from the model store 406 and loaded to generate predictions. Feedback 410 from field engineers allows the model 314 to be improved over time.

Accordingly, as shown in FIG. 4 at (212), the method 200 includes implementing a control action when the power magnitude of the wind turbine 102 is outside of a selected range (e.g. below a predetermined threshold or above a predetermined threshold). In one embodiment, for example, the control action may include generating an alarm. It should be understood that the control action as described herein may further encompass any suitable command or constraint by the controller 302. For example, in several embodiments, the control action may include temporarily de-rating or up-rating the wind turbine 102.

Up-rating or de-rating the wind turbine 102 may include speed up-rating or de-rating, torque up-rating or de-rating or a combination of both. Further, as mentioned, the wind turbine 102 may be uprated or de-rated by pitching one or more of the rotor blades 22 about its pitch axis 28. The wind turbine 10 may also be temporarily up-rated or de-rated by yawing the nacelle 106 to change the angle of the nacelle 106 relative to the direction of the wind. In further embodiments, the controller 302 may be configured to actuate one or more mechanical brake(s) in order to reduce the rotational speed of the rotor blades 112. In still further embodiments, the controller 302 may be configured to perform any appropriate control action known in the art. Further, the controller 302 may implement a combination of two or more control actions.

In addition, in several embodiments, the method 200 may include determining an uncertainty level associated with the power magnitude of the wind turbine 102 and displaying, via a user interface 322 of the system 302, the uncertainty level. Uncertainty information can be useful as fewer analytics may lead to more decision/recommendation uncertainty.

Various aspects and embodiments of the present invention are defined by the following numbered clauses:

Clause 1. A method for controlling a wind turbine, the method comprising:
- detecting, via a controller, a plurality of analytic outputs relating to power performance of the wind turbine from a plurality of different analytics;
- analyzing, via the controller, the plurality of analytic outputs relating to power performance of the wind turbine;
- generating, via the controller, at least one computer-based model of the power performance of the wind turbine using at least a portion of the analyzed plurality of analytic outputs;
- training, via the controller, the at least one computer-based model of the power performance of the wind turbine using annotated analytic outputs relating to the power performance of the wind turbine;
- estimating a power magnitude of the wind turbine using the at least one machine-learned computer-based model; and
- implementing a control action when the power magnitude of the wind turbine is outside of a selected range.

Clause 2. The method of clause 1, wherein the plurality of analytic outputs relating to power performance of the wind turbine comprises at least two of the following: power curve low production ratio, power curve historical, power curve residual, or power ensemble.

Clause 3. The method of any of the preceding clauses, wherein analyzing the plurality of analytic outputs relating to power performance of the wind turbine further comprises: filtering the plurality of analytic outputs relating to the power performance.

Clause 4. The method of any of the preceding clauses, wherein analyzing the plurality of analytic outputs relating to power performance of the wind turbine further comprises: using at least one of principal component analysis or factorization to reduce a number of dimensions in the plurality of analytic outputs.

Clause 5. The method of any of the preceding clauses, wherein analyzing the plurality of analytic outputs relating to power performance of the wind turbine further comprises: organizing, via the controller, the plurality of analytic outputs relating to power performance of the wind turbine into, at least, a first data set and a second data set.

Clause 6. The method of any of the preceding clauses, wherein the first data set of the plurality of analytic data sets comprises data from a first length of time and the second data set comprises data from a second length of time, the first length of time being longer than the second length of time.

Clause 7. The method of any of the preceding clauses, wherein training the at least one computer-based model of the power performance of the wind turbine using the annotated analytic outputs further comprises:
- continuously receiving the power magnitude of the wind turbine;
- classifying each of the received power magnitudes of the wind turbine as an under performance, an over performance, or a standard performance;
- annotating the received power magnitudes of the wind turbine; and
- machine learning the at least one computer-based model of the power performance using the annotated power magnitudes of the wind turbine.

Clause 8. The method of any of the preceding clauses, wherein training the at least one computer-based model of the power performance of the wind turbine using the annotated analytic outputs further comprises: performing a root cause analysis of the annotated power magnitudes of the wind turbine.

Clause 9. The method of any of the preceding clauses, further comprising storing the root cause analysis of the annotated power magnitudes for future use.

Clause 10. The method of any of the preceding clauses further comprising determining an uncertainty level associated with the power magnitude of the wind turbine and displaying, via a user interface of the controller, the uncertainty level.

Clause 11. The method of any of the preceding clauses, wherein the at least one computer-based model comprises a support vector machine.

Clause 12. The method of any of the preceding clauses, wherein the at least one computer-based model is a microservice.

Clause 13. A system for controlling a wind turbine, the system comprising:
- a plurality of analytics for generating a plurality of analytic outputs relating to power performance of the wind turbine;
- a controller communicatively coupled to the plurality of analytics, the controller configured to perform a plurality of operations, the plurality of operations comprising:
  - receiving the plurality of analytic outputs from the plurality of analytics;
  - analyzing the plurality of analytic outputs relating to power performance of the wind turbine;
  - generating at least one computer-based model of the power performance of the wind turbine using at least a portion of the analyzed plurality of analytic outputs;
  - training, via the controller, the at least one computer-based model of the power performance of the wind turbine using annotated analytic outputs relating to the power performance of the wind turbine;
  - estimating a power magnitude of the wind turbine using the at least one machine-learned computer-based model; and
  - implementing a control action when the power magnitude of the wind turbine is outside of a selected range.

Clause 14. The system of clause 13, wherein the plurality of analytic outputs relating to power performance of the wind turbine comprises at least two of the following: power curve low production ratio, power curve historical, power curve residual, or power ensemble.

Clause 15. The system of clauses 13-14, wherein analyzing the plurality of analytic outputs relating to power performance of the wind turbine further comprises: filtering the plurality of analytic outputs relating to operation of the wind turbine.

Clause 16. The system of clauses 13-15, wherein analyzing the plurality of analytic outputs relating to power performance of the wind turbine further comprises: using at least one of principal component analysis or factorization to reduce a number of dimensions in the plurality of analytic outputs.

Clause 17. The system of clauses 13-16, wherein analyzing the plurality of analytic outputs relating to power performance of the wind turbine further comprises: organizing, via the controller, the plurality of analytic outputs relating to the power performance of the wind turbine into, at least, a first data set and a second data set, wherein the first data set of the plurality of analytic data sets comprises data from a first length of time and the second data set comprises data from a second length of time, the first length of time being longer than the second length of time.

Clause 18. The system of clauses 13-17, wherein training the at least one computer-based model of the power performance of the wind turbine using annotated analytic outputs relating to the power performance of the wind turbine further comprises:
  continuously receiving the power magnitude of the wind turbine;
  classifying each of the received power magnitudes of the wind turbine as an under performance, an over performance, or a standard performance;
  annotating the received power magnitudes of the wind turbine; and
  machine learning the at least one computer-based model of the power performance using the annotated power magnitudes of the wind turbine.

Clause 19. The system of clauses 13-18, wherein training the at least one computer-based model of the power performance of the wind turbine using annotated analytic outputs relating to the power performance of the wind turbine further comprises:
  performing a root cause analysis of the annotated the power magnitudes of the wind turbine; and
  storing the root cause analysis of the power magnitudes of the wind turbine for future use.

Clause 20. A wind farm, comprising:
  a plurality of wind turbines each comprising a turbine controller;
  a farm-level controller communicatively coupled to each of the turbine controllers, the farm-level controller configured to perform a plurality of operations, the plurality of operations comprising:
    receiving a plurality of analytic outputs relating to power performance of each of the wind turbines from a plurality of different analytics;
    analyzing the plurality of analytic outputs relating to power performance of each of the wind turbines;
    generating at least one computer-based model of the power performance of each of the wind turbines using at least a portion of the analyzed plurality of analytic outputs;
    training the at least one computer-based model of the power performance of each of the wind turbines using annotated analytic outputs relating to the power performance of each of the wind turbines;
    estimating a power magnitude of each of the wind turbines using the at least one machine-learned computer-based model; and
    implementing a control action when the power magnitude of any one of the wind turbines is outside of a selected range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine in a wind farm, the method comprising:
  detecting, via a controller, a plurality of analytic outputs relating to power performance of the wind turbine from a plurality of different analytics, the plurality of analytic outputs relating to power performance of the wind turbine comprising, at least, a power ensemble analytic, the power ensemble analytic utilizing mean power from key reference wind turbines in the wind farm to determine an expectation of power of the wind turbine;
  analyzing, via the controller, the plurality of analytic outputs relating to power performance of the wind turbine;
  generating, via the controller, at least one computer-based model of the power performance of the wind turbine using at least a portion of the analyzed plurality of analytic outputs, wherein the at least a portion of the analyzed plurality of analytic output comprises the power ensemble analytic;
  training, via the controller, the at least one computer-based model of the power performance of the wind turbine using annotated analytic outputs relating to the power performance of the wind turbine;
  estimating a power magnitude of the wind turbine using the at least one machine-learned computer-based model; and
  implementing a control action when the power magnitude of the wind turbine is outside of a selected range.

2. The method of claim 1, wherein the plurality of analytic outputs relating to power performance of the wind turbine further comprises at least one of the following: power curve low production ratio, power curve historical, or power curve residual.

3. The method of claim 1, wherein analyzing the plurality of analytic outputs relating to power performance of the wind turbine further comprises:
  filtering the plurality of analytic outputs relating to the power performance.

4. The method of claim 1, wherein analyzing the plurality of analytic outputs relating to power performance of the wind turbine further comprises:
  using at least one of principal component analysis or factorization to reduce a number of dimensions in the plurality of analytic outputs.

5. The method of claim 1, wherein analyzing the plurality of analytic outputs relating to power performance of the wind turbine further comprises:
  organizing, via the controller, the plurality of analytic outputs relating to power performance of the wind turbine into, at least, a first data set and a second data set.

6. The method of claim 5, wherein the first data set of the plurality of analytic data sets comprises data from a first length of time and the second data set comprises data from a second length of time, the first length of time being longer than the second length of time.

7. The method of claim 1, wherein training the at least one computer-based model of the power performance of the wind turbine using the annotated analytic outputs further comprises:
  continuously receiving the power magnitude of the wind turbine;
  classifying each of the received power magnitudes of the wind turbine as an under performance, an over performance, or a standard performance;
  annotating the received power magnitudes of the wind turbine; and machine learning the at least one computer-based model of the power performance using the annotated power magnitudes of the wind turbine.

8. The method of claim 7, wherein training the at least one computer-based model of the power performance of the wind turbine using the annotated analytic outputs further comprises:
performing a root cause analysis of the annotated power magnitudes of the wind turbine.

9. The method of claim 8, further comprising storing the root cause analysis of the annotated power magnitudes for future use.

10. The method of claim 1, further comprising determining an uncertainty level associated with the power magnitude of the wind turbine and displaying, via a user interface of the controller, the uncertainty level.

11. The method of claim 1, wherein the at least one computer-based model comprises a support vector machine.

12. The method of claim 1, wherein the at least one computer-based model is a micro-service.

13. A system for controlling a wind turbine, the system comprising:
a plurality of analytics for generating a plurality of analytic outputs relating to power performance of the wind turbine, the plurality of analytics comprising both low-performing analytics and high-performing analytics, at least one of the high-performing analytics comprising a power ensemble analytic, the power ensemble analytic utilizing mean power from key reference wind turbines in the wind farm to determine an expectation of power of the wind turbine;
a controller communicatively coupled to the plurality of analytics, the controller configured to perform a plurality of operations, the plurality of operations comprising:
receiving the plurality of analytic outputs from the low-performing analytics and the high-performing analytics;
analyzing the plurality of analytic outputs relating to power performance of the wind turbine;
generating at least one computer-based model of the power performance of the wind turbine using at least a portion of the analyzed plurality of analytic outputs, wherein the at least a portion of the analyzed plurality of analytic output comprises the power ensemble analytic;
training, via the controller, the at least one computer-based model of the power performance of the wind turbine using annotated analytic outputs relating to the power performance of the wind turbine;
estimating a power magnitude of the wind turbine using the at least one machine-learned computer-based model; and
implementing a control action when the power magnitude of the wind turbine is outside of a selected range.

14. The system of claim 13, wherein the plurality of analytic outputs relating to power performance of the wind turbine further comprises at least one of the following: power curve low production ratio, power curve historical, or power curve residual.

15. The system of claim 13, wherein analyzing the plurality of analytic outputs relating to power performance of the wind turbine further comprises:
filtering the plurality of analytic outputs relating to operation of the wind turbine.

16. The system of claim 13, wherein analyzing the plurality of analytic outputs relating to power performance of the wind turbine further comprises:
using at least one of principal component analysis or factorization to reduce a number of dimensions in the plurality of analytic outputs.

17. The system of claim 13, wherein analyzing the plurality of analytic outputs relating to power performance of the wind turbine further comprises:
organizing, via the controller, the plurality of analytic outputs relating to the power performance of the wind turbine into, at least, a first data set and a second data set, wherein the first data set of the plurality of analytic data sets comprises data from a first length of time and the second data set comprises data from a second length of time, the first length of time being longer than the second length of time.

18. The system of claim 17, wherein training the at least one computer-based model of the power performance of the wind turbine using annotated analytic outputs relating to the power performance of the wind turbine further comprises:
continuously receiving the power magnitude of the wind turbine;
classifying each of the received power magnitudes of the wind turbine as an under performance, an over performance, or a standard performance;
annotating the received power magnitudes of the wind turbine; and
machine learning the at least one computer-based model of the power performance using the annotated power magnitudes of the wind turbine.

19. The system of claim 18, wherein training the at least one computer-based model of the power performance of the wind turbine using annotated analytic outputs relating to the power performance of the wind turbine further comprises:
performing a root cause analysis of the annotated the power magnitudes of the wind turbine; and
storing the root cause analysis of the power magnitudes of the wind turbine for future use.

20. A wind farm, comprising:
a plurality of wind turbines each comprising a turbine controller;
a farm-level controller communicatively coupled to each of the turbine controllers, the farm-level controller configured to perform a plurality of operations, the plurality of operations comprising:
receiving a plurality of analytic outputs relating to power performance of each of the wind turbines from a plurality of different analytics, the plurality of analytic outputs relating to power performance of the wind turbine comprising, at least, a power ensemble analytic, the power ensemble analytic utilizing mean power from key reference wind turbines in the wind farm to determine an expectation of power of the wind turbine;
analyzing the plurality of analytic outputs relating to power performance of each of the wind turbines;
generating at least one computer-based model of the power performance of each of the wind turbines using at least a portion of the analyzed plurality of analytic outputs, wherein the at least a portion of the analyzed plurality of analytic output comprises the power ensemble analytic;
training the at least one computer-based model of the power performance of each of the wind turbines using annotated analytic outputs relating to the power performance of each of the wind turbines;

estimating a power magnitude of each of the wind turbines using the at least one machine-learned computer-based model; and implementing a control action when the power magnitude of any one of the wind turbines is outside of a selected range.

\* \* \* \* \*